US007497316B2

(12) United States Patent
Hysell et al.

(10) Patent No.: US 7,497,316 B2
(45) Date of Patent: Mar. 3, 2009

(54) SORTATION CONVEYOR APPARATUS AND METHODS

(75) Inventors: Brian Hysell, West Chester, OH (US); John Moore, Batavia, OH (US)

(73) Assignee: FKI Logistex, Inc., Cincinnati, OH (US)

( * ) Notice: Subject to any disclaimer, the term of this patent is extended or adjusted under 35 U.S.C. 154(b) by 7 days.

(21) Appl. No.: 11/747,782

(22) Filed: May 11, 2007

(65) Prior Publication Data
US 2007/0295579 A1 Dec. 27, 2007

Related U.S. Application Data

(60) Provisional application No. 60/834,387, filed on Jul. 31, 2006, provisional application No. 60/800,167, filed on May 12, 2006.

(51) Int. Cl.
*B65G 47/10* (2006.01)
(52) U.S. Cl. .............................. 198/370.02; 198/370.07; 198/890
(58) Field of Classification Search .................. 198/890, 198/370.02, 370.07
See application file for complete search history.

(56) References Cited

U.S. PATENT DOCUMENTS

| 2,448,133 | A | * | 8/1948 | Yorgiadis | .......................... 73/812 |
| 4,884,677 | A | * | 12/1989 | Yu et al. | ................. 198/370.02 |
| 5,165,515 | A | | 11/1992 | Nitschke et al. | |
| 5,217,105 | A | * | 6/1993 | Sapp et al. | .............. 198/370.02 |
| 6,041,909 | A | * | 3/2000 | Shearer, Jr. | ............. 198/370.02 |
| 6,044,956 | A | * | 4/2000 | Henson et al. | ......... 198/370.02 |
| 6,478,144 | B1 | * | 11/2002 | Sweazy | ....................... 198/890 |
| 6,513,642 | B1 | | 2/2003 | Shearer, Jr. et al. | |
| 6,522,943 | B2 | * | 2/2003 | Dierauer | ..................... 700/223 |
| 6,669,001 | B1 | * | 12/2003 | Bromley et al. | ........ 198/370.06 |
| 6,702,106 | B1 | | 3/2004 | Sweazy | |
| 6,854,584 | B2 | * | 2/2005 | Henson et al. | ......... 198/370.06 |
| 6,951,274 | B2 | | 10/2005 | Zeitler et al. | |
| 7,086,519 | B2 | * | 8/2006 | Veit et al. | .............. 198/370.02 |
| 7,240,781 | B2 | * | 7/2007 | Ramaker et al. | ....... 198/370.02 |
| 7,383,936 | B2 | * | 6/2008 | Enomoto | ............... 198/370.02 |

OTHER PUBLICATIONS

International Search Report for PCT/US07/11381, Jul. 23, 2008.

* cited by examiner

*Primary Examiner*—Douglas A Hess
(74) *Attorney, Agent, or Firm*—Dinsmore & Shohl LLP

(57) ABSTRACT

Sortation conveyor apparatus and methods for selectively diverting articles from a primary conveying surface onto branch lines are provided. In one embodiment, the apparatus comprises a control system for selectively operating activating elements. The control system is configured to assign two or more pusher elements to each article to be diverted, and to ensure proper diversion of articles when adjacent articles are spaced apart on the primary conveying surface by a distance which is less than the width of an individual pusher element. In one embodiment, diversion is provided by a single activating mechanism for a plurality of pusher elements per branch destination, and by rotating the article during the initial diverting movement and contact with the pusher elements. In one embodiment, a method comprises assigning memory cells to first and second articles based upon the location of the articles along the primary conveyor, and determining if the second article is to be diverted to the same location as the first article, and if so, assigning the trailing cell assigned to the trailing end of the first article to other than the first article.

20 Claims, 5 Drawing Sheets

SORTATION CONVEYOR APPARATUS AND METHODS

CROSS REFERENCE TO RELATED APPLICATIONS

This application claims the benefit of U.S. Provisional Patent Application No. 60/800,167, filed May 12, 2006, and U.S. Provisional Patent Application No. 60/834,387, filed Jul. 31, 2006, the entire disclosures of which are considered as part of the disclosure of the present application and are hereby incorporated by reference herein.

FIELD OF THE INVENTION

The present invention is directed to sortation conveyor apparatus and methods.

BACKGROUND OF THE INVENTION

In conveyor systems for conveying and distributing articles, a series of conveyed articles are typically transported along moving conveying surfaces. Such conveyor systems will typically include one or more sortation devices which divert selected articles from a primary conveying path onto one or more secondary conveying paths.

Sortation devices often employ pusher elements which are mounted relative to the conveying surface. Often, the pusher elements are mounted such that they may be selectively moved across the conveying surface in order to eject an article from the primary conveying path onto a secondary conveying path or other location. One particular sortation device of this type is referred to as a "shoe sorter," wherein the pusher elements are termed "shoes."

In a typical shoe sorter, the primary conveying surface is provided by a plurality of transverse tubes (rollers) or slats that form the transport surface. A plurality of pusher elements that are part of, or supported by, the transport surface and are guided in a set position along the length of the sorter during normal forward operation. The pusher elements can take on many forms such as belted slats, pins, and molded blocks. Historically the most prevalent design is referred to as a shoe, although other designs are possible. Here after the term shoe and pusher element shall be used to include all conventional shoes, as well as other diverting elements such as but not limited to slats, belts, rollers, etc. When it is necessary to direct an article from the main conveyor run to an adjacent takeaway conveyor, a switch mechanism causes an assigned set of pusher element to be diverted to slide across the conveyor surface in a diagonal direction. The diverted shoes thus engage and divert the article to a secondary conveying path, such as a takeaway conveyor. Such shoe sorters often use guide tracks or guide surfaces which direct the assigned set of shoes laterally across the conveying surface, while shoes which are not assigned continue to travel along the conveying surface in their set position.

In these shoe sorters and other types of sortation devices, the control system ensures that the appropriate set of pusher elements is assigned to each carton, and that the assigned pusher elements are directed across the primary conveying surface at the proper time. Sorter throughput depends on a variety of factors, particularly the speed of the conveying surface and the size of the gap between adjacent articles being sorted. If the size of the gap is small, it can be difficult for the control system to not only assign the proper set of pusher elements, but also ensure that the assigned set of pusher elements are diverted across the conveying surface at the proper time.

SUMMARY

According to one embodiment, a sortation conveyor apparatus is provided for selectively diverting articles from a primary conveying surface onto one of a plurality of branch lines. The apparatus comprises a driven primary conveying surface configured to support and transport articles thereon, two or more branch lines extending away from said primary conveying surface, and a plurality of pusher elements mounted for movement with said primary conveying surface for selective movement across said primary conveying surface so as to selectively divert articles onto said branch lines. The apparatus further comprises activating mechanisms configured to move said pusher elements across said primary conveying surface, a single activating mechanism being configured to move a plurality of pusher elements. The apparatus further comprises a control system for selectively operating the activating mechanisms. The control system is configured to assign two or more of said pusher elements to each article to be diverted, and to selectively operate the activating mechanisms when the assigned pusher elements are located adjacent a predetermined branch line for the article to which the pusher elements are assigned. The control system is also configured to ensure proper diversion of articles when adjacent articles are spaced apart on the primary conveying surface by a distance which is less than the width of an individual pusher element.

According to another embodiment, a method for transporting items on a conveyor system is provided. The method comprises receiving destinations for a plurality of articles to be sequentially transported in a primary conveying direction on a primary conveyor system. The primary conveyor system comprises pusher elements provided along the primary conveyor system and configured to move articles in a direction different than the primary conveying direction to selectively divert articles to branch destinations off of the primary conveyor system. The method further comprises spacing the articles apart on the primary conveyor system in the primary conveying direction, wherein the spacing of at least two adjacent articles is less than the width of a pusher element, and assigning some of the pusher elements to each article. The method also comprises providing a signal based upon the location of an article as it travels in the primary conveying direction, wherein the signal is configured to move pusher elements assigned to the article at an appropriate location along the primary conveyor system to cause the article to be moved in a direction different than the primary conveying direction and to rotate upon initiation of the movement, to thereby divert the article to their corresponding branch destinations off of the primary conveyor system.

In one embodiment, a computer implemented method for controlling a conveyor system is provided, the method comprising receiving destinations for a plurality of articles to be sequentially transported along a primary conveyor system, and providing in memory cells representing locations along the primary conveyor system. The primary conveyor system comprises pusher elements for diverting articles to branches off of the primary conveyor system. The method further comprises assigning cells to first and second articles based upon the location of the articles along the primary conveyor system, wherein the first and second articles are adjacent one another, determining if the second article is to be diverted to the same destination as the first article, and if so, assigning a trailing cell assigned to the trailing end of the first article to other than the first article. The method further comprises using the cell assignments, providing signals to activate pusher elements at corresponding locations along the primary conveyor system to divert the first and second articles to destinations off of the primary conveyor system.

BRIEF DESCRIPTION OF THE DRAWINGS

The following detailed description will be more fully understood in view of the drawings in which.

Figure 1:
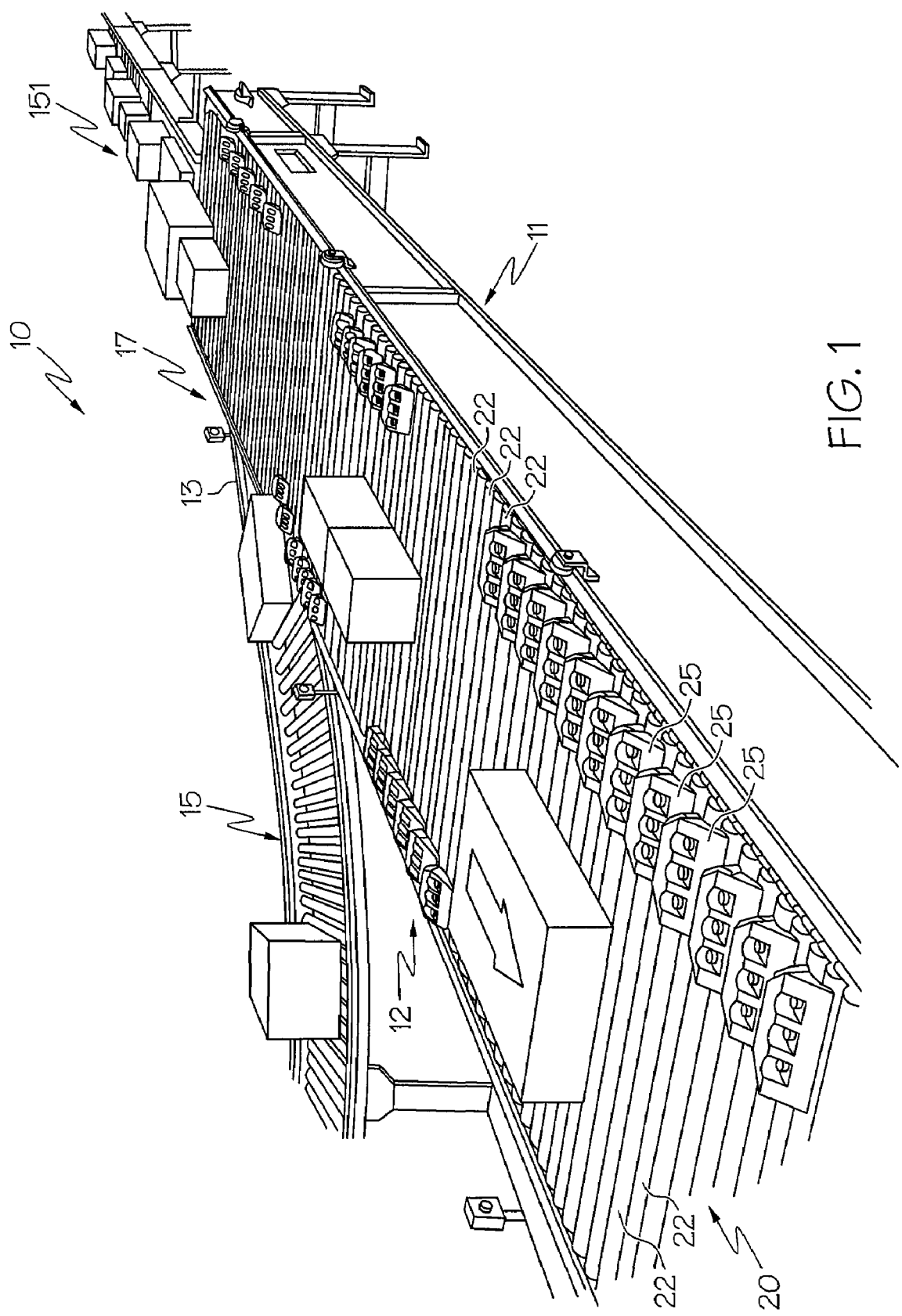
FIG. 1 is a perspective view of a shoe sorter in accordance with one embodiment of the present invention.

The embodiments set forth in the drawings are illustrative in nature and are not intended to be limiting of the invention defined by the claims. Moreover, individual features of the drawings and the inventions will be more fully apparent and understood in view of the detailed description.

DETAILED DESCRIPTION OF ILLUSTRATIVE EMBODIMENTS

The present invention is directed to sortation conveyor apparatus and methods which can accommodate reduced gap size between adjacent conveyed articles. By reducing the size of the gap between articles delivered to the sortation conveyor apparatus, article throughput may be increased for a given conveying speed. In other words, articles to be sorted may be inducted onto the sortation conveyor apparatus with a smaller gap between adjacent articles. While the present invention will be described in connection with a shoe sorter of the type shown and described in U.S. Pat. No. 4,884,677 ("the '677 patent," which is incorporated herein by reference), the present invention, particularly the methods and control systems described herein, may be used in conjunction with other types of sortation devices. For example, the shoes or pusher elements may comprise belt and/or follower elements of a linear belt sorter, such as of the type described in U.S. Pat. Nos. 6,669,001 and 6,854,584 and Canadian Patent No. 2,448,133, which are hereby incorporated herein by reference. As another example, the primary conveying surface may be provided by tubes (rollers) or slats extending transverse to the direction of travel of articles moving on the primary conveying surface. Of course other types of conveying surfaces may be employed. In addition, the pusher elements (e.g., shoes) described herein may have any of a variety of shapes and configurations which allow the pusher elements to be selectively pushed across the primary conveying surface.

In general, embodiments of the sortation conveyor apparatus of the present invention may include a main conveying line along which articles are transported in a forward direction. The apparatus provides selective diversion of the articles as desired onto branch conveying lines positioned at strategic points along the sides of the main conveyor. The main conveyor may include a frame which supports the primary conveying surface. The conveying surface may support a plurality of pusher elements (e.g., divert shoes, belts, etc.) that are mounted to allow for lateral shifting across the conveying surface (e.g., transverse to the primary conveying direction). For example, the divert shoes may generally travel with the primary conveying surface in the primary conveying direction along either of opposing sides of the conveying surface when the sorter is operating in a straight-through mode, i.e. the article is moving forwardly for later downstream handling. Alternatively, as will be described in more detail below, the divert shoes may be selectively diverted to slide across the transport surface in a diagonal path in the divert mode to engage and direct articles onto a branch conveying line (e.g., onto a takeaway conveyor).

Guide tracks or surfaces may be mounted to the conveyor frame beneath the conveying surface to engage a guide member extending from each divert shoe so as to guide the shoes in either the forward direction when in straight-through mode or, alternatively, diagonally across the transport surface when in the divert mode. In order to initiate the divert mode, a divert switch apparatus may be provided at selected positions along the conveyor (i.e., at divert stations associated with each branch line). The divert switch apparatus intercepts the divert shoes when actuated and directs them toward the predetermined diagonal path necessary to direct an article to the selected takeaway conveyor. A control system is used to determine which shoes should be diverted at each divert station in order to direct each article onto the proper branch line.

Figure 2:
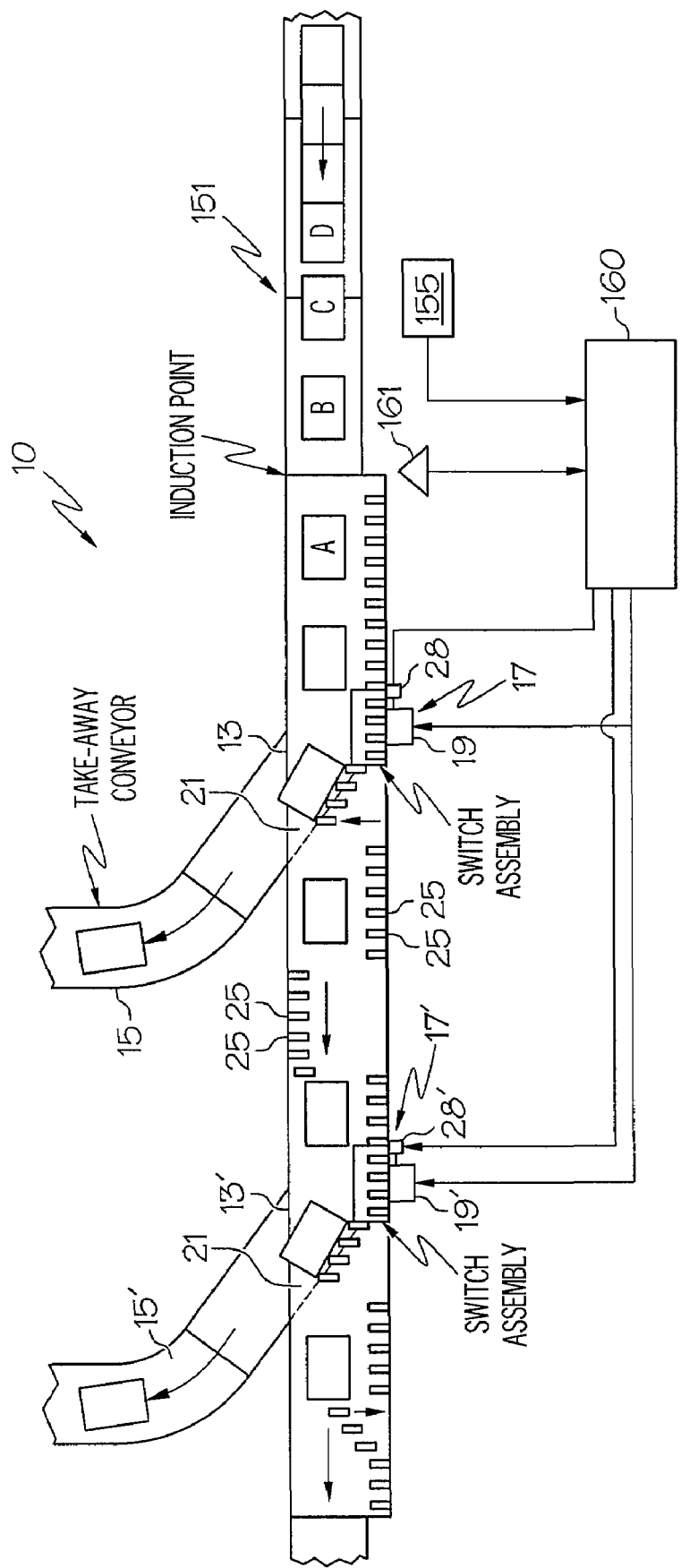
FIG. 2 is a schematic, top plan view of a shoe sorter in accordance with one embodiment of the present invention.

In particular, FIGS. 1 and 2 depict a sortation conveyor apparatus according to one embodiment of the present invention, specifically, a shoe sorter 10. Shoe sorter 10 includes a frame generally designated as 11 which defines the main conveying line 12. Branch outlets 13 and 13' connect with branch lines 15 and 15', respectively. An endless apron 20 is supported for driven movement on the frame 11 and defines the primary conveying surface which moves from right to left in FIG. 2. In the embodiment shown, the apron 20 comprises a pair of roller chains, and multiple parallel cross tubes 22 carried by the chains in spaced relation with each other lengthwise of the apron so that the uppermost portions of these tubes define a discontinuous surface in a horizontal plane on which packages are supported and conveyed. Of course the conveying surface may be provided by any of a variety of other structures known to those skilled in the art, such as a plurality of interconnected slats in place of the cross tubes 22 (as described, for example, in U.S. Pat. No. 5,217, 105, which is incorporated herein by way of reference). It also will be understood that any number of branch outlets and branch lines can be provided, as desired.

Articles (e.g., cartons, packages, products, etc.) to be sorted may be delivered to shoe sorter 10 in a variety of ways. For example, an induction conveyor 151 may be provided in order to deliver a series of articles (e.g., cartons) to the sortation conveyor apparatus. The cartons are typically arranged in a single file line along the induction conveyor, with a gap between adjacent cartons. This gap may be the same for adjacent cartons, or may vary. In addition, the induction conveyor itself (or another device(s) known to those skilled in the art) may be used to set the gap between adjacent cartons to a predetermined value(s), if desired.

The purpose of the shoe sorter is to receive a series of cartons (or other articles) and to selectively direct cartons to one or more locations. In the shoe sorter shown in FIGS. 1 and 2, cartons delivered by induction conveyor 151 travel along the main conveying line 12 (i.e., on conveying surface 20) and are selectively diverted onto one of the branch lines 15 and 15'. Not all of the cartons need be diverted, as some may continue on downstream of the shoe sorter. A takeaway conveyor may also be provided on each branch line (e.g., a moving belt, driven rollers, etc.) in order to transport diverted cartons along the branch line, away from the main conveying line. The operation of the shoe sorter is automated in that destination information for each carton may be read (e.g., by a bar code scanner) upstream of the shoe sorter 10, and a control system of the shoe sorter utilizes the destination information to divert each carton onto the appropriate branch line.

Cartons may be selectively diverted from the main conveying line onto one of the branch lines using pusher elements 25 which are selectively moved across the conveying surface 20 at divert stations (17 and 17') located adjacent to each of the branch outlets. In one embodiment, each pusher element 25 (also referred to as a shoe) is mounted for sliding movement on each pair of adjacent cross tubes 22, as shown in FIG. 1 herein and as further described in the '677 patent. In embodiments using slats instead of cross tubes, each shoe may be mounted for sliding movement on one or more of the slats which provide the primary conveying surface of the shoe sorter.

During operation, the shoes 25 are retained along either the right-hand or left-hand side of apron 20, as seen in FIG. 1, and travel with the cross tubes or slat on which each is mounted. When a carton traveling on the apron approaches a position (i.e., a divert station) which is opposite the branch outlet through which it is to be diverted, the shoes 25 traveling on the apron beside that package are diverted such that they move across the apron in such timed relation that they push the carton through the branch outlet onto the branch conveyor line. Each diverted shoe slides along the cross tubes or slat upon which it is mounted.

The shoes may be provided in any of a variety of shapes and configurations. In one embodiment, and as further described and depicted in the '677 patent, each of the shoes may include a guide pin (33 in FIG. 9 of the '677 patent) which extends downwardly away from the bottom surface of the shoe. The guide pin may be centered with respect to the shoe, and may carry a bearing (35 in FIG. 9 of the '677 patent) positioned immediately below the bottom surface of the shoe.

Figure 4A:
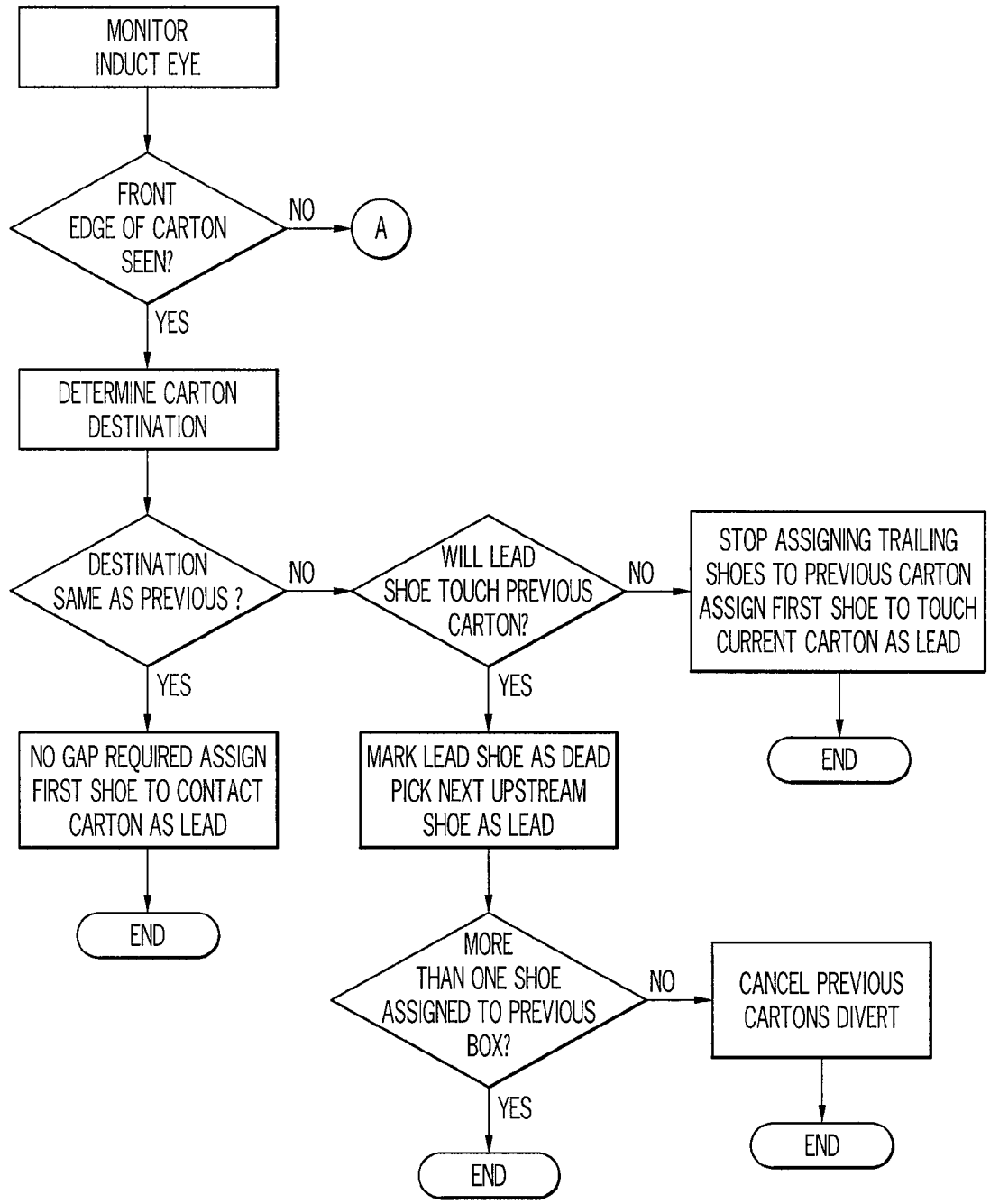
FIG. 4 is a flow chart depicting the assignment of shoes to cartons by the control system of a shoe sorter in accordance with one embodiment of the present invention.
Figure 4B:
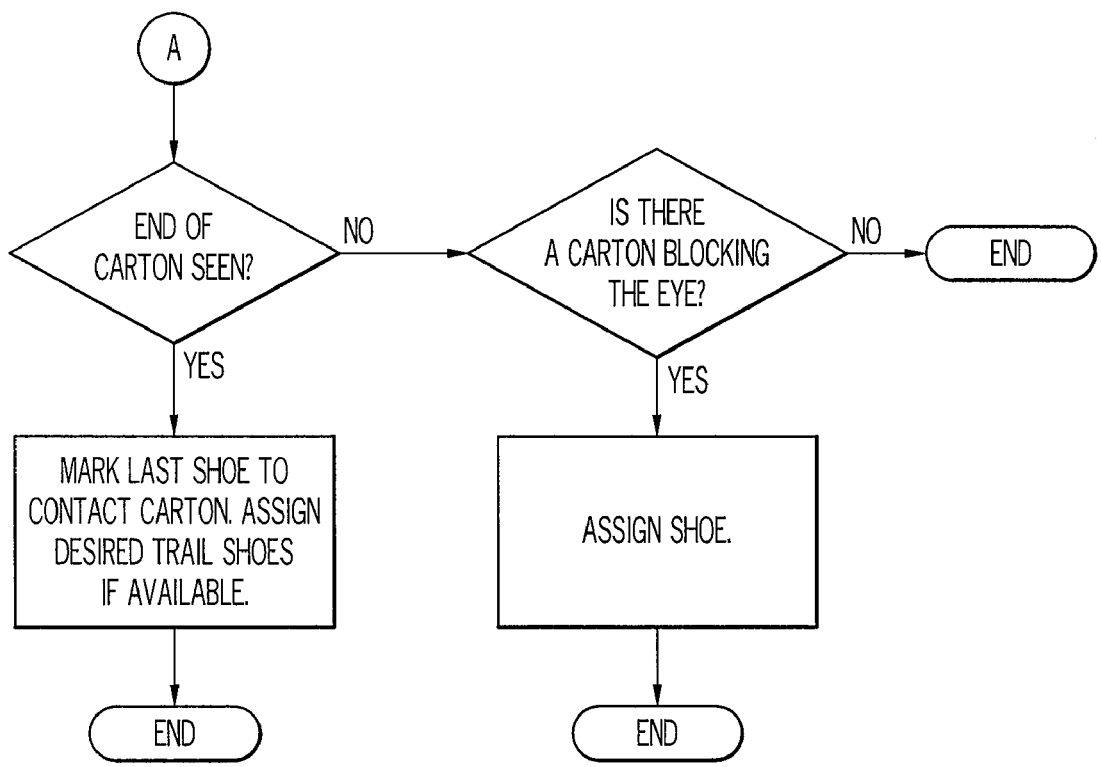

As previously noted, each of the shoes 25 is retained along the right-hand or left-hand side of apron 20. This may be accomplished, for example, by means of a channel shaped guide (60 in FIGS. 2 and 4 of the '677 patent) which is proportioned to slidably receive the end of each guide pin. A similar pin guide channel (62 in FIG. 2 of the '677 patent) is provided along the left-hand side of the apron.

At each divert station (17 and 17'), a switch assembly may be provided, as well as at least one guide member (or guide channel) for directing diverted shoes laterally across the conveying surface. For example, an angle member (127 in FIG. 2 of the '677 patent) may be provided beneath apron 20 and extend at an angle with respect to the direction of travel of apron 20. When activated, the switch assembly diverts shoes away from the guide channel in which the guide pin of the shoe is traveling. For example if the shoes are moving towards a divert station along the right-hand side of apron 20 (e.g., FIG. 1), the switch assembly selectively diverts shoes to the left such that, for example, the bearing on the guide pin contacts the angle member (as further described in the '677 patent). As a diverted shoe continues to move forward with the apron, the bearing of the diverted shoe will continue to travel along the angle member. This results in the diverted shoe moving to the left along the slat or rollers on which it sits until the shoe reaches the left-hand side of the apron 20. By way of example, the guide pin of the shoe may enter a second pin guide channel provided along the left-hand side of the apron (as described in the '677 patent).

As long as the switch mechanism remains activated, successive shoes are diverted sequentially in the same manner, as they reach the switch mechanism, such that a line of shoes extends diagonally across the apron. A carton located on apron 20 adjacent such diverted shoes will thus be diverted into the branch outlet at the divert station. This method of article diversion may also be performed in the same manner for right-hand diverting.

As best seen in FIG. 2, diverted cartons will also rotate or turn as they are diverted, and immediately upon contact between a diverting shoe and the carton. This occurs because, as the diverted shoes travel across the primary conveying surface 20 (i.e., the apron), a downstream shoe will always be located further to the left than the adjacent shoe upstream. In this method and system, only a single switch mechanism and guide track are used for each branch outlet, and each shoe will sequentially reach the switch during travel of the shoes along with the conveying surface. Accordingly, each shoe will sequentially divert and contact the carton, from near its leading edge to near its trailing edge, causing rotation to the carton and diverting it along the branch line. Multiple diverting or activating mechanisms (switch mechanisms, tracks, or motors, etc.), and the expenses thereof, are therefore not needed for each pusher element in this embodiment. As the conveying surface rotates underneath and back towards the upstream end of the shoe sorter, shoes that were diverted are returned to the opposite side of the conveying surface in order that such shoes are available to repeat the sortation process.

A control system is also provided in order to direct the sortation process. In particular, the control system generally comprises at least one controller and sensors in communication therewith. For each article which is to be diverted, the control system assigns shoes to that article. The control system then actuates the switch assembly of the appropriate divert station when the first of the assigned shoes reaches the divert station adjacent the branch line onto which the associated article is to be diverted. In one embodiment, the control system includes a central controller (160 in FIG. 2) which controls the firing (i.e. activating) of the diverter switch mechanisms in order to direct cartons to the appropriate branch conveyor line.

Central controller 160 may be provided in a variety of forms, and processes signals provided by one or more devices (such as photosensors, scanners, readers, sensors, etc.), in accordance with one or more sets of instructions, and outputs signals which direct the operation of the shoe sorter. By way of example, central controller 160 may comprise any device (or combination of devices) which is capable of processing data in accordance with one or more sets of instructions. For example, central controller 160 may include a processor (e.g., a CPU), as well as memory which, among other things, stores data and instructions (i.e., software). Examples include a personal computer, general purpose computer, workstation, server, mainframe, embedded system, microprocessor, programmable logic controller (PLC), discrete logic system, and the like (including combinations of two or more of the foregoing). Central controller 160 processes data provided by, for example, photosensor 161 in order to generate signals for use in actuating the switch assemblies at the proper time in order to properly divert articles onto the appropriate branch line.

While a controller or other control mechanism/device may be provided at each divert station (with or without a central controller), the central controller may be in direct communication with the switch assemblies at each divert station such that local controllers are not needed. In such embodiments, the central controller determines when each switch assembly is actuated and disabled in order to properly divert shoes and cartons contacted by the diverted shoes.

In the embodiment shown, a local control module (17 and 17' in FIG. 2) is provided at each divert station. Each local control module may comprise, a controller of the type described above with respect to the central controller (e.g., a processor and memory). In the embodiment shown, however, local control modules 17 and 17' merely ensure that the divert switch at that station is fired (i.e., actuated) between the guide pins of adjacent shoes, as further described herein. The local control modules play no other role in the control system of the shoe sorter embodiment shown in FIGS. 1 and 2.

Cartons (or other types of articles to be sorted) proceed towards shoe sorter 10 along induction conveyor 151. The cartons are typically arranged in a single file line along the induction conveyor, with a gap between adjacent cartons. While the gap may be the same or different for each pair of adjacent cartons, embodiments of the present invention allow the gap to be smaller than what was previously possible. In fact, the gap may be shorter than the width of a single shoe. (As used herein, the width of shoe refers to the center-to-center distance of adjacent shoes, and therefore includes the small gap present between adjacent shoes.) In some embodiments, the center-to-center distance of adjacent shoes in the primary conveying direction is five inches. Accordingly, in some embodiments, adjacent cartons can be spaced less than five inches apart in the primary conveying direction (e.g., from their closest points). Moreover, in some embodiments, adjacent cartons can be spaced in the primary conveying direction four or fewer inches apart, three or fewer inches apart, two or fewer inches apart, and one or fewer inches apart. The control system is configured to assign sufficient shoes to a carton for proper diverting, while also ensuring that the assigned shoes, when diverted across apron 20 at the proper divert station, will not contact a trailing carton which is not supposed to be diverted at that divert station. In this manner, shoe sorter throughput may be increased without increasing sorter speed (i.e, the speed of the primary conveying surface, or apron 20). It should be pointed out, however, that the rotation of cartons as they are diverted (see, e.g., FIG. 2) does act as a limit on how small the gap between adjacent cartons can be.

Destination information for cartons or other articles delivered to the shoe sorter (e.g., by induction conveyor 151) may be provided to the central controller 160 in a variety of ways. For example, destination data (i.e., which branch line, if any, a particular carton is to be diverted onto), may be manually input into the central controller or input as a data set (e.g., a data file) which was previously created. Alternatively, in the embodiment shown, a destination detecting device 155 (FIG. 2) in communication with central controller 160 may be provided, such as adjacent induction conveyor 151. By way of example, the destination detecting device 155 may comprise an optical scanner (e.g., a bar code reader) which scans a portion (e.g., a region of the carton on which is printed a bar code) of each carton or a tag or label affixed to the carton, as each carton passes by the scanner. Alternatively, the destination detecting device may comprise a reader which detects identifying information associated with each carton. Such a reader may comprise, for example, an RFID reader which acquires data from an RFID tag (active or passive) associated with (e.g., within, upon or attached to) each carton. The signal(s) provided by the destination detecting device to the central controller may represent not only destination data for each carton inducted onto the primary conveying surface 20 of shoe sorter 10, but also other carton data (e.g., carton size or other useful information). The destination data for a carton indicates which branch conveyor line, if any, each carton is to be diverted onto.

A sensor 161, such as a photosensor, may also be provided at a predetermined point upstream of, or along the primary conveying path of shoe sorter 10. In the embodiment shown, photosensor 161 is located immediately upstream of shoe sorter 10, adjacent induction conveyor 151, and is in communication with central controller 161. Photosensor 161 detects the leading and trailing edges of each carton passing by the photosensor. As discussed further herein, additional photosensors 28 and 28' may also be provided at or adjacent to the switch assembly of each divert station in order to, for example, detect passage of the bearing on the guide pin of each shoe which passes by. Of course other types of sensing devices may be used to sense the leading and trailing edges of cartons and the passage of divert shoes (or portions thereof, such as the guide pins or guide pin bearings).

Central controller 160 uses the signals from the destination detecting device 155 and the article sensor 161 in order to effect actuation of the divert switch mechanisms at the proper time, in accordance with stored instructions (e.g., software). The control system software takes into account the gap between adjacent cartons and whether or not adjacent packages are being diverted to the same branch conveyor line.

As described in more detail below, central controller 160 tracks cartons as they move through the shoe sorter. When a carton arrives at the divert station associated with the branch line onto which that carton is supposed to be diverted, central controller 160 sends an "enable" signal to the local control module of that divert station. In response, the local control module actuates the switch mechanism.

In one embodiment, however, the switch mechanism is not necessarily actuated immediately upon receipt of the enable signal from the central controller. Rather, the local control module actuates the switch mechanism so as to ensure that the switch is actuated between shoe guide pins. For example, photosensors 28 and 28' may be positioned so that they are able to detect the passing of each shoe guide pin, particularly the bearing on each shoe guide pin. In one embodiment, photosensors 28 and 28' may be positioned beneath or adjacent apron 20 so that they are able to detect the passing of the guide pin bearing on each shoe. Photosensors 28 and 28' may be provided in communication with local control modules 19 and 19', respectively, as well as central controller 160. Photosensors 28 and 28' may simply provide a signal which indicates whether or not the photosensor is blocked by a guide pin bearing (e.g., an ON signal when blocked and an OFF signal when not blocked, or vice versa).

The local control module uses the signal from divert station photosensor 28 to determine when to actuate the switch mechanism following receipt of an enable signal from central controller 160 so that the switch is only fired between shoe guide pins. The manner in which this is done may depend, for example, on the location of photosensors 28 and 28' with respect to the switch mechanism of the associated divert station, as well as the speed of the conveying surface 20. For example, once the local control module has received the enable signal from central controller 160, the local control module 19 may actuate the switch mechanism on the next triggering edge of bearing. The triggering edge may simply correspond to the moment that the photosensor signal changes state—from OFF to ON, or from ON to OFF. Thus, depending on the speed of the shoe sorter and the location of the photosensor, the local control module, after receiving the enable signal from central controller 160, may actuate the switch upon receipt of an OFF or an ON signal from the associated photosensor 28. In this manner, the local control module ensures that the switch is actuated between the guide pins on adjacent shoes.

Following switch actuation, the switch remains open for a period of time so that the appropriate number of shoes are diverted along the track 21 for the carton being directed onto the branch line. In one embodiment, at least two shoes are always diverted for each carton. With or shortly after the enable signal, the central controller may send a signal to the local control module indicating how many shoes are to be diverted. The local control module may then count how many guide pin bearings are detected by photosensor 28, based on the signal received from that photosensor. Once the appropriate number of guide pin bearings have been detected, the local control module closes (i.e., disables) the switch mechanism, thereby preventing subsequent shoes from being diverted. In this manner, the carton is properly diverted onto the branch line by the movement of the series of shoes across the conveying surface.

Alternatively, central controller 160 may receive signals from the local photosensors (28 and 28'), and count the number of shoes following switch actuation. After the appropriate number of shoes (i.e., guide pin bearings) have been detected, central controller 160 may disable (i.e., close) the switch, either directly or by sending a signal to the local control module. In fact, in some embodiments, the local control modules may be eliminated entirely and the central controller will control actuation and disablement of the switch mechanisms.

The number of shoes diverted for any given carton must, of course, be sufficient to complete the operation of pushing the carton through the appropriate branch outlet. This may be accomplished by "assigning" shoes to each carton to be diverted. Then, when the first assigned shoe reaches the divert station for that carton, the switch at that divert station is actuated. In one embodiment, the first shoe which, if diverted, would contact the front edge of the carton is assigned to that carton and identified as the "lead shoe"—i.e., the first shoe which is diverted for a given carton. All of the shoes following the lead shoe which, if diverted, would contact the carton, are also assigned to that carton. The shoes assigned for a given carton also will typically include the last shoe which, if diverted, would contact the carton, as well as a predetermined number of trailing shoes following that last shoe. These trailing shoes (e.g., one, two, three, or perhaps more) are included in the series of shoes which are diverted for a given carton, even though these trailing shoes normally will not actually contact the carton as they move across the apron. One purpose of the trailing shoes is to ensure that a carton does not spin off of the shoes while being diverted. However, as further discussed herein, the control system of the present invention is configured to cancel one or more of the trailing shoes, or even the last shoe which will contact a carton if diverted, if it is determined by the central controller that those trailing shoes (or even the last carton contacting shoe) will contact the upstream carton if diverted.

The central controller is responsible for "assigning" shoes to each carton. The assigned shoes are those which are to be diverted at the appropriate divert station in order to push the carton onto the proper branch conveyor line. The central controller, however, does not assign any type of identifier (e.g., a number or other identifier) to individual shoes. Instead, the central controller simply assigns shoes to a carton and then monitors the travel of the assigned shoes as they progress along the length of the shoe sorter. At the moment the central controller determines that the lead shoe assigned to a carton arrives (or is about to arrive) at the divert station for that carton, the enable signal is sent to the local control module of that divert station.

In one embodiment, shoes may be "assigned" to each carton in the following manner. The distance from each divert station, particularly the switch mechanism thereof, to the induction point (see FIG. 2) is measured as a multiple of the width of each shoe. For example, the distance from the induction point (i.e., where the induction conveyor meets the conveying surface of the shoe sorter) to the switch mechanism of the first divert station 17 might be four shoe widths, and the distance to the switch mechanism of the second divert station 17' nine shoe widths. By measuring distances in this manner, shoes may be "assigned" to cartons without the need for uniquely identifying each individual shoe.

In particular, the software associated with the central controller establishes a data array which tracks the location of shoes as they move through the shoe sorter. This data array may generally comprise two rows of cells. The number of columns will depend on the length of the shoe sorter, particularly the distance from the induction point to the last divert station.

Figure 3:
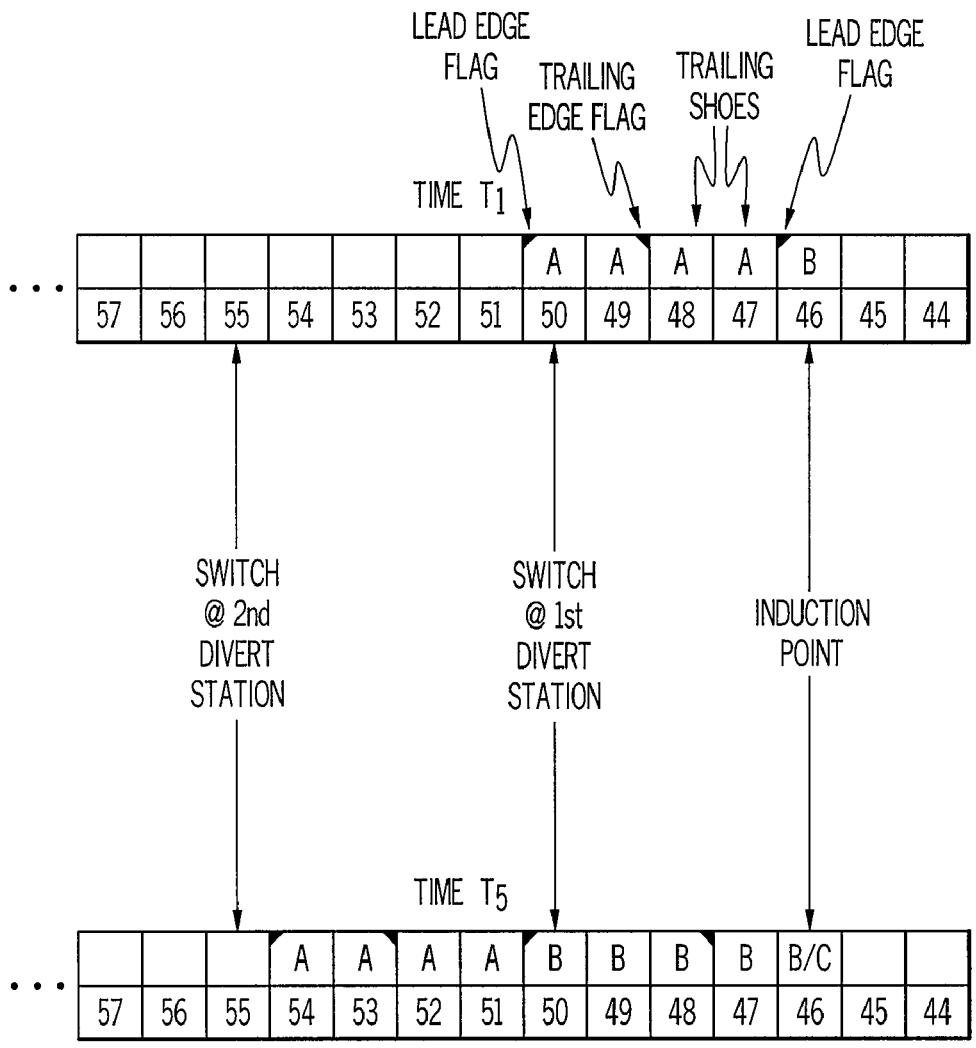
FIG. 3 is a schematic illustration of a data array used by the control system of a shoe sorter in accordance with one embodiment of the present invention.

As shown in FIG. 3 which is a simplified illustration of this data array, one row of the data array (in the depicted example, the bottom row) simply comprises a sequential series of integers which correspond to locations along the length of the primary conveying surface. For example, the first divert station is arbitrarily identified as 50. Each cell in the lower row of the data array is also defined to have a width equal to the width of each shoe (the center-to-center distance between adjacent shoes). Thus, in the example wherein the switch mechanism of the first divert station is located four shoe widths from the induction point, the induction point corresponds to the cell containing numeral 46 in the data array. Similarly, the switch mechanism of the second divert station corresponds to numeral 55 in the bottom row of the data array. The upper row of cells in the data array generally correspond to shoes as they travel the length of the primary conveying surface 20 of shoe sorter 10. As the shoe sorter is operating and the shoes travel the length of the primary conveying surface 20, the position of particular shoes move from right to left in the sample data array of FIG. 3. Since the number of columns in the data array is dependent on the length of the shoe sorter (which is less than the total number of shoes multiplied by shoe width), typically less than half of all shoes will be represented by a cell in the upper row of the data array at any given time.

In order to simplify the description of the process of assigning shoes to individual cartons, photosensor 161 in the exemplary embodiment is located at the induction point. (However, the photosensor could be located at any point upstream of the first divert station). At time T1, the leading edge of carton B is detected by the photo sensor and the divert location for carton B was previously (or contemporaneously) determined by the destination detecting device 155 and provided to central controller 160 (or otherwise provided to the central controller).

As shown in FIG. 3, when the leading edge of carton B is detected, the cell in the data array located immediately above numeral 46 (corresponding to the induction point) is identified as being assigned to carton B (e.g., by placing some form of carton identifier in the cell of the data array). Since the cells in the upper row of the data array generally correspond to the location of a portion of the shoes, the cell above numeral 46 which is assigned to carton B corresponds to the first shoe which would contact the front (or leading) edge of carton B if that shoe is diverted. If the divert location for carton B is not the same as the divert location for the previous (i.e., downstream) carton A, the cell located above numeral 46 in the data array is not assigned to carton B if that cell has previously been identified as one that would contact the previous/downstream carton A if that shoe is diverted (as further described below). The first cell assigned to carton B is also identified with a lead edge flag in that cell, indicating that the shoe represented by this cell at time T1 will not only contact carton B if diverted, but also is the first shoe assigned to carton B.

Over time, the information in the cells of the upper row of the data array will move from right to left in the data array. In other words, at time T2, the information which was in the cell located above numeral 50 in the data array at time T1 will be in the cell located above numeral 51 in the data array at time T2. Each time interval may correspond to the amount of time it takes each shoe to advance one shoe width. However, in one embodiment, rather than establishing a time interval based on a measured or predetermined speed of the conveying surface, the central controller may use the signal from photosensor 28 at first divert station 17 to control the shifting of data in the upper row of cells in the data array. In particular, the information stored in the upper row of cells will shift one cell to the left each time photosensor 28 detects, for example, the leading edge of guide pin bearing. Photosensor 28, since it is located at the first divert station prior to any shoes being diverted, is the only divert station photosensor which will detect the passage of every shoe. In the embodiment shown, downstream photosensors (e.g., 28') will not detect the passage of guide pin bearings on shoes which were diverted to the opposite side of apron 20 at an upstream divert station.

Following assignment of the lead edge cell for carton B at time T1, at each subsequent time interval T2, T3, etc. (as measured by the detection of subsequent shoes by photosensor 28), the cell located above numeral 46 will be assigned to carton B until the trailing edge of carton B is detected by photosensor 161. When the trailing (or rear) edge of carton B is detected, the cell immediately above numeral 46 in the data array is not only assigned to carton B, but also includes a trailing edge flag. This trailing edge flag indicates that this cell corresponds to the last shoe which, if diverted, will contact carton B. One or more trailing cells may also be assigned to carton B, in order to help prevent a carton from spinning off of the shoes when diverted. In the example shown in FIG. 3, the control system automatically assigns two trailing cells to each carton (although any number of trailing cells may be assigned). Thus, at time T5 (four time intervals after T1), it is seen that five cells are assigned to carton B, one of which includes a lead edge flag, and one of which includes a trailing edge flag.

If carton B is designated to be diverted at the first divert station (i.e., corresponding to numeral 50 in the lower row of the data array), as soon as the data array is updated such that the identifier for carton B is in the cell immediately above numeral 50, central controller 160 will send the enable command to local control module 19 at first divert station 17. Similarly, once the cell immediately above numeral 50 in the data array no longer includes an identifier for a carton to be diverted at the first divert station (time T9 in the example of FIG. 3), central controller 160 will disable the switch mechanism at the first divert station.

As also shown in FIG. 3, when the next carton C arrives at the induction point (T5), the cell assignment process is repeated. In this instance, when the front edge of carton C is identified, the cell located above numeral 46 in the data array at that time is already assigned to carton B. If that cell were not only assigned to carton B, but also included a trailing edge flag, the shoe corresponding to that cell, if diverted, would contact both cartons B and C. In such instance, the control system will deem this cell to be "dead" and no carton identifier would be inserted into that cell in the data array (i.e., the identifier for carton B would be removed).

In the example shown, however, the cell above numeral 46 at time T5 when the leading edge of carton C is detected is merely identified as a trailing shoe for carton B (since a trailing edge flag is not present). In this instance, the identifier in the cell above numeral 46 is changed from carton B to carton C, and a leading edge flag is inserted. Thus, at time T7, the cell above numeral 48 in the data array is identified to carton C, rather than carton B, and includes a lead edge flag.

During time interval T8, the photosensor 161 has detected not only the trailing edge of carton C, but also the leading edge of carton D. This situation can occur because the control system is designed to allow for carton gaps which are less than the width of a single shoe. If carton C and D are to be diverted at the same divert station, onto the same branch line, the cell immediately above numeral 46 in the data array is simply reassigned to carton D and identified with the lead edge flag. On the other hand, if carton C and D are not supposed to be diverted at the same divert station, the cell located above numeral 46 in the data array will be designated as "dead," and will include neither an identifier for carton C nor an identifier for carton D. The next upstream cell (i.e., the cell above numeral 45 in the data array) is then assigned to carton D and includes a lead edge flag. A flow chart further describing the cell/shoe assignment process is provided in FIG. 4.

Finally, the take-away conveyors of the branch conveyor lines (15 and 15') may travel at a slower rate than the conveying surface of the shoe sorter. Because of this, the branch conveyor lines may sometimes become backed up if too many cartons are diverted onto that branch conveyor line. Thus, embodiments of the shoe sorter may include a means for ensuring that the branch conveyor lines do not become overloaded with diverted cartons. If a back up condition is detected, cartons will not be diverted to that branch conveyor line until the back up condition is no longer present.

The above methods and algorithms can be implemented in a variety of computer or electronic systems having one or more processors, controllers, or circuitry for execution of code, instructions, programs, software, firmware, and the like for carrying out the desired tasks.

The specific illustrations and embodiments described herein are exemplary only in nature and are not intended to be limiting of the invention defined by the claims. For example, destination detecting device 155 and sensor 161 could be combined into a single device which provides signals to the central controller. Further embodiments and examples will be apparent to one of ordinary skill in the art in view of this specification and are within the scope of the claimed invention.

The foregoing description of the various embodiments and principles of the inventions has been presented for the purposes of illustration and description. It is not intended to be exhaustive or to limit the inventions the precise forms disclosed. Many alternatives, modifications, and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations, and variations, and have been discussed or suggested herein, as well as all others that fall within the principles, spirit, and broad scope of the various inventions as defined by the claims.

What is claimed is:

1. A method for transporting items on a conveyor system, the method comprising receiving destinations for a plurality of articles to be sequentially transported in a primary conveying direction on a primary conveyor system, wherein the primary conveyor system comprises pusher elements provided along the primary conveyor system and configured to move articles in a direction different than the primary conveying direction to selectively divert articles to branch destinations off of the primary conveyor system;

spacing the articles apart on the primary conveyor system in the primary conveying direction, wherein the spacing of at least two adjacent articles is less than the width of a pusher element;

assigning some of the pusher elements to each article; and providing a signal based upon the location of an article as it travels in the primary conveying direction, wherein the signal is configured to move pusher elements assigned to the article at an appropriate location along the primary conveyor system to cause the article to be moved in a direction different than the primary conveying direction and to rotate upon initiation of the movement, to thereby divert the article to their corresponding branch destinations off of the primary conveyor system.

2. The method as recited in claim 1, wherein if a leading article is to be diverted to a branch destination that is different than an article trailing the leading article, keeping inactive the pusher element adjacent the trailing edge of the leading article.

3. The method as recited in claim 1, further comprising providing memory locations representing locations along the primary conveyor system; and assigning memory locations to first and second articles based upon the location of the first and second articles along the primary conveyor system, wherein the first article is adjacent to and downstream from the second article and spaced from the second article by less than the width of a pusher element.

4. The method as recited in claim 3, further comprising determining if the second article adjacent the first article is to be diverted to a different branch destination than the first article, and if so, assigning the memory location that would correspond to the trailing end of the first article to other than the first article;

transporting the first and second articles along the primary conveyor system; and using the memory location assignments, moving appropriate pusher elements when the first and second articles have reached corresponding diverting locations along the primary conveyor system to cause the pusher elements to move the first and second articles and to divert the first and second articles to a branch destination off of the primary conveyor system.

5. The method as recited in claim 3, further comprising:

determining when the first article has been assigned a memory location where it is to be diverted; and moving corresponding pusher elements when the first article has been assigned the memory location where it is to be diverted.

6. The method as recited in claim 3, further comprising:

sensing when the first and second articles have changed conveying locations during conveying;

changing the memory locations assigned to the first and second articles as they change locations during conveying.

7. The method as recited in claim 1, wherein the pusher elements comprise at least one of divert shoes and belts of a linear belt sorter.

8. The method as recited in claim 1, wherein the primary conveyor system comprises a single diverting mechanism for each branch location, wherein the single diverting mechanism is configured to receive the signal and move all of the assigned pusher elements for an article in response to the signal without the need for diverting mechanism for each pusher element.

9. The method as recited in claim 8, wherein the single diverting mechanism comprises a single track and a single switch located at each branch destination.

10. The method as recited in claim 1, wherein the spacing of the adjacent articles is less than five inches in the primary conveying direction.

11. The method as recited in claim 1, wherein the spacing of the adjacent articles is no more than three inches in the primary conveying direction.

12. A sortation conveyor apparatus for selectively diverting articles from a primary conveying surface onto one of a plurality of branch lines, comprising:

a driven primary conveying surface configured to support and transport articles thereon;

two or more branch lines extending away from said primary conveying surface;

a plurality of pusher elements mounted for movement with said primary conveying surface for selective movement across said primary conveying surface so as to selectively divert articles onto said branch lines;

activating mechanisms configured to move said pusher elements across said primary conveying surface, wherein a single activating mechanism is configured to move a plurality of pusher elements; and a control system for selectively operating said activating mechanisms, wherein said control system is configured to assign two or more of said pusher elements to each article to be diverted, and to selectively operate said activating mechanisms when said assigned pusher elements are located adjacent a predetermined branch line for the article to which the pusher elements are assigned, wherein said control system is configured to ensure proper diversion of articles when adjacent articles are spaced apart on the primary conveying surface by a distance which is less than the width of an individual pusher element.

13. The apparatus as recited in claim 12, wherein the pusher elements comprise elements of at least one of a shoe sorter and a linear belt sorter.

14. The apparatus as recited in claim 12, further comprising a memory, wherein the control system is configured to assign memory locations to first and second articles based upon the location of the articles along the primary conveying surface, and to use the memory locations to operate the activating mechanisms when the articles have reached appropriate diverting locations, wherein the second article is upstream from the first article.

15. The apparatus as recited in claim 14, wherein the control system is configured such that if the second article is not to be diverted to the same branch line as the first article, reassigning the memory location corresponding to the trailing end of the first article.

16. The apparatus as recited in claim 14, wherein the control system is further configured to sense when the first article has been assigned a memory location where it is to be diverted and to activate pusher elements when the first article has been assigned the memory location where it is to be diverted.

17. The apparatus as recited in claim 12, wherein each activating mechanism is configured to sequentially move the plurality of pusher elements to cause the article to be diverted to rotate upon initial contact with a first moved pusher element of the plurality of pusher elements.

18. The apparatus as recited in claim 12, wherein the control system does not assign a unique identifier to each pusher element.

19. The apparatus as recited in claim 12, wherein the spacing distance is less than five inches in the primary conveying direction.

20. The apparatus as recited in claim 12, wherein the spacing distance is no more than three inches in the primary conveying direction.

* * * * *